(12) United States Patent
Nolterieke et al.

(10) Patent No.: US 9,639,347 B2
(45) Date of Patent: May 2, 2017

(54) UPDATING A FIRMWARE PACKAGE (75) Inventors: Michael H. Nolterieke, Raleigh, NC (US); William G. Pagan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1432 days.

(21) Appl. No.: 12/643,625

(22) Filed: Dec. 21, 2009

(65) Prior Publication Data
US 2011/0154313 A1 Jun. 23, 2011

(51) Int. Cl.
*G06F 9/44* (2006.01)

(52) U.S. Cl.
CPC ...................... *G06F 8/68* (2013.01)

(58) Field of Classification Search
None
See application file for complete search history.

(56) References Cited

U.S. PATENT DOCUMENTS

| | | | |
|---|---|---|---|
| 6,553,507 B1 | 4/2003 | Cohen | |
| 7,146,609 B2* | 12/2006 | Thurston et al. | 717/169 |
| 7,168,003 B2* | 1/2007 | Lozano et al. | 714/25 |
| 7,243,347 B2 | 7/2007 | Palmer et al. | |
| 7,480,907 B1* | 1/2009 | Marolia et al. | 717/174 |
| 7,669,199 B2* | 2/2010 | Cope | G06F 8/61 705/59 |
| 7,770,165 B2* | 8/2010 | Olson et al. | 717/168 |
| 7,865,890 B2* | 1/2011 | Sumi et al. | 717/169 |
| 8,090,744 B1* | 1/2012 | Baird | 707/791 |
| 8,234,250 B1* | 7/2012 | Sharma | G06F 17/3015 707/649 |
| 8,555,273 B1* | 10/2013 | Chia | G06F 8/665 717/168 |
| 2003/0046524 A1* | 3/2003 | Zimmer | G06F 11/1417 713/1 |
| 2003/0217358 A1* | 11/2003 | Thurston | G06F 8/60 717/174 |
| 2004/0255048 A1* | 12/2004 | Lev Ran et al. | 709/249 |

(Continued)

OTHER PUBLICATIONS

HP & Enfora Partner to Provide Over-The-Air Firmware Updates; Jun. 2009; 2 Pages; Hewlett Packard Development CO. L.P.

(Continued)

*Primary Examiner* — Steven Snyder
*Assistant Examiner* — Christopher Bartels
(74) *Attorney, Agent, or Firm* — Brandon C. Kennedy; Robert R. Williams; Kennedy Lenart Spraggins LLP (57) ABSTRACT

Updating a firmware package including receiving an update package for the firmware package, the firmware package including currently installed components supporting one of a plurality of software layers, the update package including update components that correspond to the currently installed components; retrieving information describing a state of the currently installed components; comparing the information describing the state of the currently installed components to information describing a state of the corresponding update components; constructing a revised update package that includes only update components having a state more recent than the state of the corresponding currently installed components; and updating the currently installed components with corresponding update components of the revised update package.

20 Claims, 5 Drawing Sheets

(56) References Cited

U.S. PATENT DOCUMENTS

| | | | |
|---|---|---|---|
| 2005/0028143 A1* | 2/2005 | Aridor et al. | 717/122 |
| 2006/0155768 A1* | 7/2006 | Weil | G06F 8/71 |
| 2006/0174242 A1 | 8/2006 | Zhu et al. | |
| 2006/0190806 A1* | 8/2006 | Sasson et al. | 715/500 |
| 2006/0236082 A1* | 10/2006 | Horimoto | G06F 15/177 |
| | | | 713/1 |
| 2007/0006035 A1* | 1/2007 | Usui | 714/38 |
| 2007/0169081 A1 | 7/2007 | Zhao et al. | |
| 2007/0180509 A1* | 8/2007 | Swartz | G06F 9/4406 |
| | | | 726/9 |
| 2007/0226320 A1* | 9/2007 | Hager et al. | 709/219 |
| 2007/0226698 A1* | 9/2007 | Cascaval | G06F 9/45516 |
| | | | 717/127 |
| 2007/0277169 A1 | 11/2007 | Rao et al. | |
| 2008/0028385 A1 | 1/2008 | Brown et al. | |
| 2008/0046877 A1 | 2/2008 | Ford | |
| 2008/0059959 A1 | 3/2008 | Chen et al. | |
| 2008/0126778 A1 | 5/2008 | Bishop et al. | |
| 2008/0148225 A1* | 6/2008 | Sarkar et al. | 717/107 |
| 2008/0243862 A1* | 10/2008 | Pathak et al. | 707/10 |
| 2008/0244553 A1 | 10/2008 | Cromer et al. | |
| 2009/0007089 A1 | 1/2009 | Rothman et al. | |
| 2009/0007105 A1* | 1/2009 | Fries | G06F 8/65 |
| | | | 718/1 |
| 2009/0089567 A1 | 4/2009 | Boland, IV et al. | |
| 2009/0282301 A1* | 11/2009 | Flynn et al. | 714/710 |
| 2011/0113070 A1* | 5/2011 | McCurdy et al. | 707/802 |

OTHER PUBLICATIONS

High-End UNIX and Linux system to transform IT economics; Apr. 2005; IBM Corporation; Somers, NY, United States.

\* cited by examiner

UPDATING A FIRMWARE PACKAGE

BACKGROUND OF THE INVENTION

Field of the Invention

The field of the invention is data processing, or, more specifically, methods, apparatus, and products for updating a firmware package.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Software applications and computer hardware components of computer systems today are supported by firmware. Firmware may be implemented as one or more modules of computer program instructions, typically stored in ROM or Flash memory, that support operation of higher level software applications and computer hardware. From time to time firmware is updated. It is preferable to reduce the time needed to transfer, update the firmware, and reboot a computer system so that the updated firmware may be used.

SUMMARY OF THE INVENTION

Methods, apparatus, and products for updating a firmware package are described that include receiving, by a firmware updating module comprising a module of automated computing machinery, an update package for the firmware package. The firmware package includes one or more currently installed components. Each of the currently installed components supports one of a number of software layers. The update package includes one or more update components that correspond to the currently installed components of the firmware package. Each of the update components supports one of the plurality of software layers. Updating the firmware package also includes retrieving, by the firmware updating module from the firmware package during operation of the firmware package, information describing a state of the currently installed components; comparing, by the firmware updating module, the information describing the state of the currently installed components to information describing a state of the corresponding update components; constructing, by the firmware updating module, a revised update package that includes only update components having a state more recent than the state of the corresponding currently installed components; and updating, by the firmware updating module, the currently installed components with corresponding update components of the revised update package.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
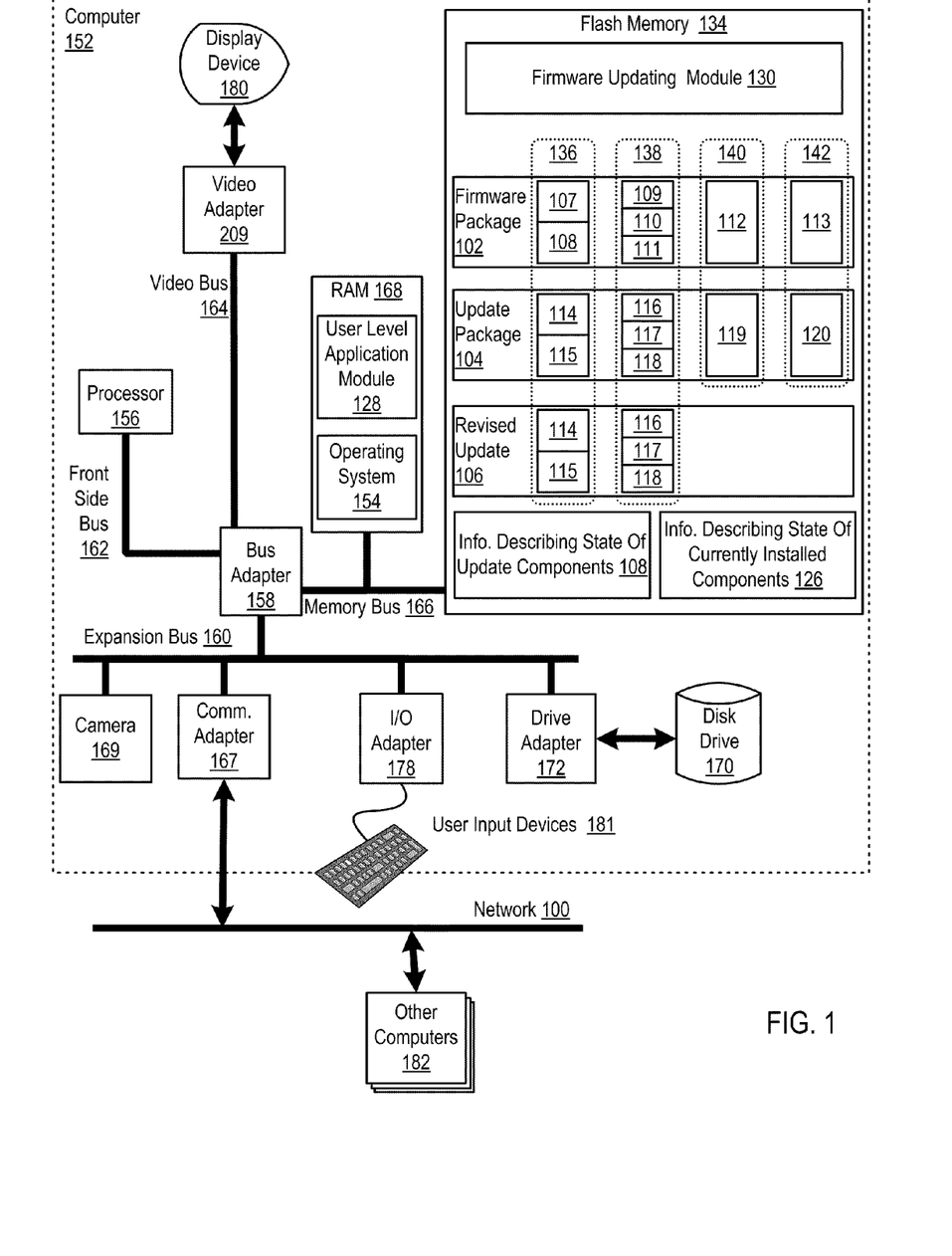
FIG. 1 sets forth a network diagram of a system for updating a firmware package according to embodiments of the present invention.

Exemplary methods, apparatus, and products for updating a firmware package in accordance with the present invention are described with reference to the accompanying drawings, beginning with FIG. 1. FIG. 1 sets forth a network diagram of a system for updating a firmware package according to embodiments of the present invention. The system of FIG. 1 includes a automated computing machinery comprising an exemplary computer (152) useful in updating a firmware package (102) according to embodiments of the present invention. Firmware as the term is used in this specification refers to module of computer program instructions and data structures that support higher level operation of one or more software applications or components of a computer. The term 'package' is used here to describe the composition of firmware as including one or more components. That is, a firmware package consists of a set of components. A component is a module of computer program instructions that carries out one or more particular tasks. Examples of components include operating system firmware, boot loader firmware, system administration interface firmware, computer hardware firmware, network management firmware, management services firmware, web services firmware, and so on as will occur to readers of skill in the art. Each of the components of firmware packages according to embodiments of the present invention support a software layer—one or more system level or user level application modules that employ the components during operation. Examples of software layers include a boot loader layer, an operating system layer, a management services layer, a web services layer, and so on.

The computer (152) of FIG. 1 includes at least one computer processor (156) or 'CPU' as well as random access memory (168) ('RAM') and Flash memory (134) which is connected through a high speed memory bus (166) and bus adapter (158) to processor (156) and to other components of the computer (152).

Stored in flash memory is a firmware package (102). The firmware package (102) several currently installed components (107-113). The currently installed components (107-

108) support software layer (136), the components (109-111) support software layer (138), component (112) supports software layer (140), and component (113) supports software layer (142). The components (107-113) described as 'currently installed' are those components presently active in the computer system—modules presently supporting user level and system level applications executing in the computer (152) as well as computer hardware components.

Also stored in Flash memory (134) is a firmware updating module (130), a module of automated computing machinery that updates firmware packages in accordance with the present invention. The firmware updating module (130) updates the firmware package (102) of FIG. 1 by receiving an update package (104) for the firmware package. The update package (104) in the example of FIG. 1 includes several update components (113-120). The update components (114-120) are said to 'correspond' to currently installed components of the firmware package (102). Corresponding components are components of the same type. Update components that correspond to currently installed components are either the same component or an updated version of that component. An update component comprising a boot loader component, for example, corresponds to a currently installed boot loader component of the firmware package (102), an update component comprising an operating system component corresponds to a currently installed operating system component of the firmware package (102), and so on. In addition to being of the same type, corresponding components also correspond to on another by supporting the same software layer. In the system of FIG. 1, for example, update component (114) and currently installed component (107) correspond by type and support the same software layer (136).

The firmware updating module (130) may also retrieve, from the firmware package (102) during operation of the firmware package (102), information (126) describing a state of the currently installed components. A 'state' as the term is used here describes the version of a component. Software components are often updated from one version to another, where changes in the underlying computer program instructions are made. A component having a more recent state than a corresponding component is a component of a later version, a more recently changed or updated version of the component.

The firmware module (130) may also compare the information (126) describing the state of the currently installed components to information (106) describing a state of the corresponding update components and construct a revised update package (106). The revised update package (106) is constructed in a way such that the revised update package (106) includes only update components having a state more recent than the state of the corresponding currently installed components. That is, the revised update package (106) includes only components having of a later version than their corresponding currently installed components. In the system of FIG. 1, for example, the revised update package (106) constructed by the firmware updating module (130) includes only update components (114-118). These update components (114-118) are of a later version, a more recent version, than the corresponding currently installed components (107-111). By contrast, the revised update package (106) does not include update components (119-120). The update components (119-120), are not of the a later version than the corresponding currently installed components (112-113).

The firmware updating module (130) may also update the currently installed components (107-111) with corresponding update components (114-118) of the revised update package (106). In this way, only currently installed components for which an update component is actually present are updated. In systems of the prior art, all currently installed components are typically replaced with the components of a firmware update, regardless of whether an update for the currently installed components actually exists in the firmware update.

The firmware updating module (130), firmware package (102), update package (104), revised update package (106), information (108) describing the state of update components, and the information (126) describing the state of currently installed components in the example of FIG. 1 are shown in Flash memory (134), but many components of such software may also be stored in other non-volatile memory, such as, for example, on a disk drive (170), an optical disk drive, electrically erasable programmable read-only memory (so-called 'EEPROM'), RAM drives, and so on, as will occur to those of skill in the art.

Stored in RAM (168) is an user level application module (128), a module of computer program instructions for carrying out user level data processing tasks. Examples of such user level application modules (128) include word processing applications, spreadsheet applications, database management applications, web browser applications, media library applications, media playback applications, and so on as will occur to readers of skill in the art. Also stored in RAM (168) is an operating system (154). Operating systems useful updating a firmware package according to embodiments of the present invention include UNIX™, Linux™, Microsoft XP™, AIX™, IBM's i5/OS™, and others as will occur to those of skill in the art.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for updating a firmware package according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for updating a firmware package according to embodiments of the present invention include modems for wired dial-up communications, Ethernet (IEEE 802.3) adapters for wired data communications network communications, and 802.11 adapters for wireless data communications network communications.

The arrangement of computers (152, 182), network (100), and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
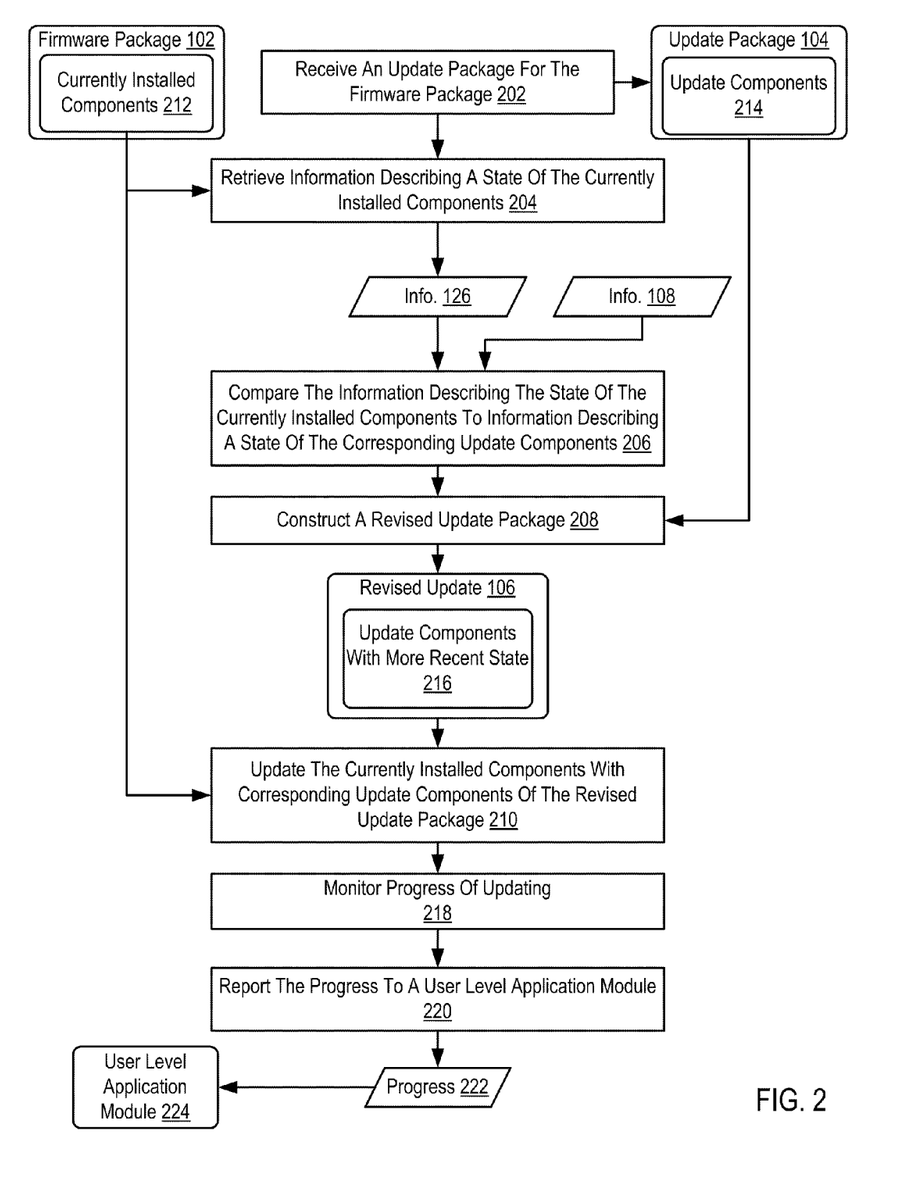
FIG. 2 sets forth a flow chart illustrating an exemplary method for updating a firmware package according to embodiments of the present invention.

For further explanation, FIG. 2 sets forth a flow chart illustrating an exemplary method for updating a firmware package (102) according to embodiments of the present invention. The method of FIG. 2 is carried out by a firmware updating module comprising a module of automated computing machinery similar to the firmware updating module (130) in the Example of FIG. 1. The method of FIG. 2 includes receiving (202), by the firmware updating module, an update package (104) for the firmware package (102). The firmware updating module may receive an update package (104) in various ways including, for example, through a data communications network from a server pushing an update to the firmware updating module, by direct installation from a higher level software application at the behest of a system administrator, and in other ways as will occur to readers of skill in the art.

In the method of FIG. 2, the firmware package (102) includes one or more currently installed components (212). Each of the currently installed components (212) supports one of a number of software layers. The update package (104) also includes one or more update components (214) that correspond to the currently installed components (212) of the firmware package (102). Each of the update components (214) also supports one of the software layers.

The method of FIG. 2 also includes retrieving (204), by the firmware updating module from the firmware package (102) during operation of the firmware package (102), information (126) describing a state of the currently installed components (212). Retrieving (204) information (126) describing a state of the currently installed components (212) may be carried out in many ways, including for example, by requesting the information (126) from the firmware package (102) through an application programming interface (API) exposed to the firmware updating module for such a purpose, by retrieving the information from a known storage location designated for such a purpose, or in other ways as will occur to readers of skill in the art.

The method of FIG. 2 also includes comparing (206), by the firmware updating module, the information (126) describing the state of the currently installed components (212) to information (108) describing a state of the corresponding update components (214). Comparing (206) the information (126) describing the state of the currently installed components (212) to information (108) describing a state of the corresponding update components (214) may be carried out by determining, for each update component, whether the update component's state is more recent than the corresponding currently installed component's state.

The method of FIG. 2 also includes constructing (208), by the firmware updating module, a revised update package (106) that includes only update components (214) having a state more recent than the state of the corresponding currently installed components (212). Constructing (208) a revised update package (106) that includes only update components (214) having a state more recent than the state of the corresponding currently installed components (212) may be carried out by copying, to a new storage location, only those update components having a more recent state as well as any portion of the update package necessary to effect installation of the update components.

The method of FIG. 2 also includes updating (210), by the firmware updating module, the currently installed components (212) with corresponding update components (216) of the revised update package (106). Updating (210) the currently installed components (212) with corresponding update components (216) of the revised update package (106) may be carried out by replacing the currently installed components (212) with a corresponding update component included in the revised update package (106).

The method of FIG. 2 also includes monitoring (218) progress (222) of updating (210) the currently installed components (212) with corresponding update components (216) of the revised update package (106). Monitoring (218) progress (222) of updating (210) the currently installed components (212) may be carried out in various ways. The firmware updating module may, for example, maintain an identification of the update component presently being installed, track a percentage of the installation of all update components, track the time taken to install each update, and so on.

The method of FIG. 2 also includes reporting (220) the progress (222) to a user level application module (224). Reporting (220) the progress (222) to a user level application module (224) may be carried out by sending data representing the progress (222) to the user level application module (224) automatically without user intervention, periodically upon a predefined period of time, each time installation of an update component is complete, or upon request by a user.

Figure 3:
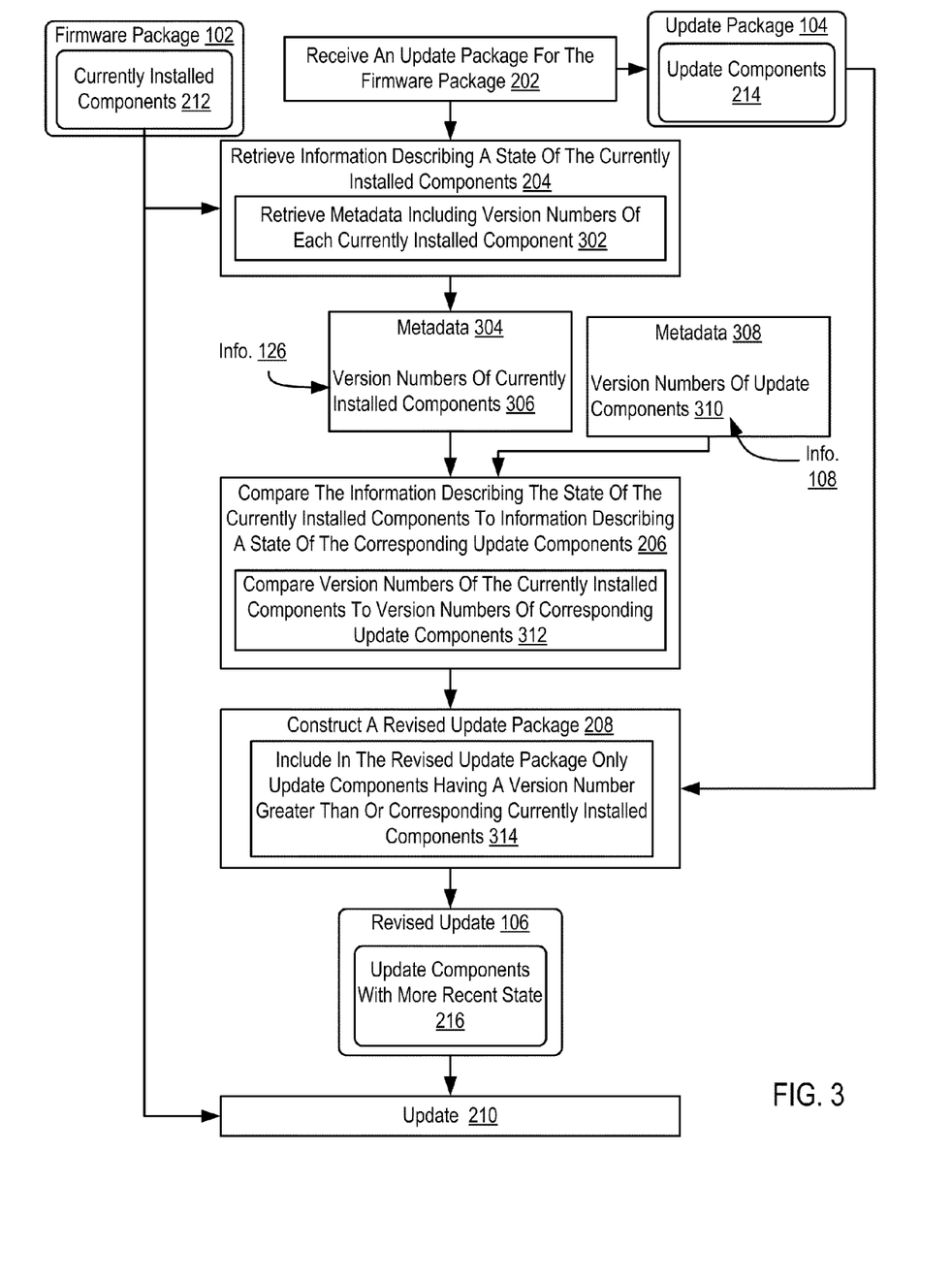
FIG. 3 sets forth a flow chart illustrating a further exemplary method for updating a firmware package according to embodiments of the present invention.

For further explanation, FIG. 3 sets forth a flow chart illustrating a further exemplary method for updating a firmware package according to embodiments of the present invention. The method of FIG. 3 is similar to the method of FIG. 2 in that the method of FIG. 3 is carried out by a firmware updating module and the method of FIG. 3 includes receiving (202) an update package (104) for the firmware package (102); retrieving (204) information (126) describing a state of the currently installed components (212); comparing (206) the information (126) to information (108) describing a state of the corresponding update components (214); constructing (208) a revised update package (106) that includes only update components (214) having a state more recent than the state of the corresponding currently installed components (212); and updating (210) the currently installed components (212) with corresponding update components (216) of the revised update package (106).

The method of FIG. 3 differs from the method of FIG. 2, however, in that in the method of FIG. 3, retrieving (204) information (126) describing a state of the currently installed components (212) includes retrieving (302) metadata (304) including information describing the currently installed components. The information describing the currently installed components includes a version number (306) of each currently installed component (212). Metadata (304) is data that describes other data. The metadata (304) in the example of FIG. 3 may be any data structure, such as a list, a table, a structured document such as a extensible markup language (XML) document, or the like. A version number indicates the state of a component. Larger version numbers indicate amore recent state, while smaller version numbers indicate an older state. A component having a version number of 2.1 for example, has an older state than a corresponding component having a version number of 3.0.

Also in the method of FIG. 3, comparing (206) the information (126) describing the state of the currently installed components (212) to information (108) describing a state of the corresponding update components (214) includes comparing (312) version numbers (306) of the currently installed components (212) to version numbers (310) of corresponding update components (214). Like the version numbers of currently installed components (306), the version numbers of the update components (310) may also be defined in metadata (308).

Also in the method of FIG. 3, constructing (208) a revised update package (106) is carried out by including (314) in the revised update package (106) only update components (216) having a version number (310) greater than the version number (306) of the corresponding currently installed components (212).

Figure 4:
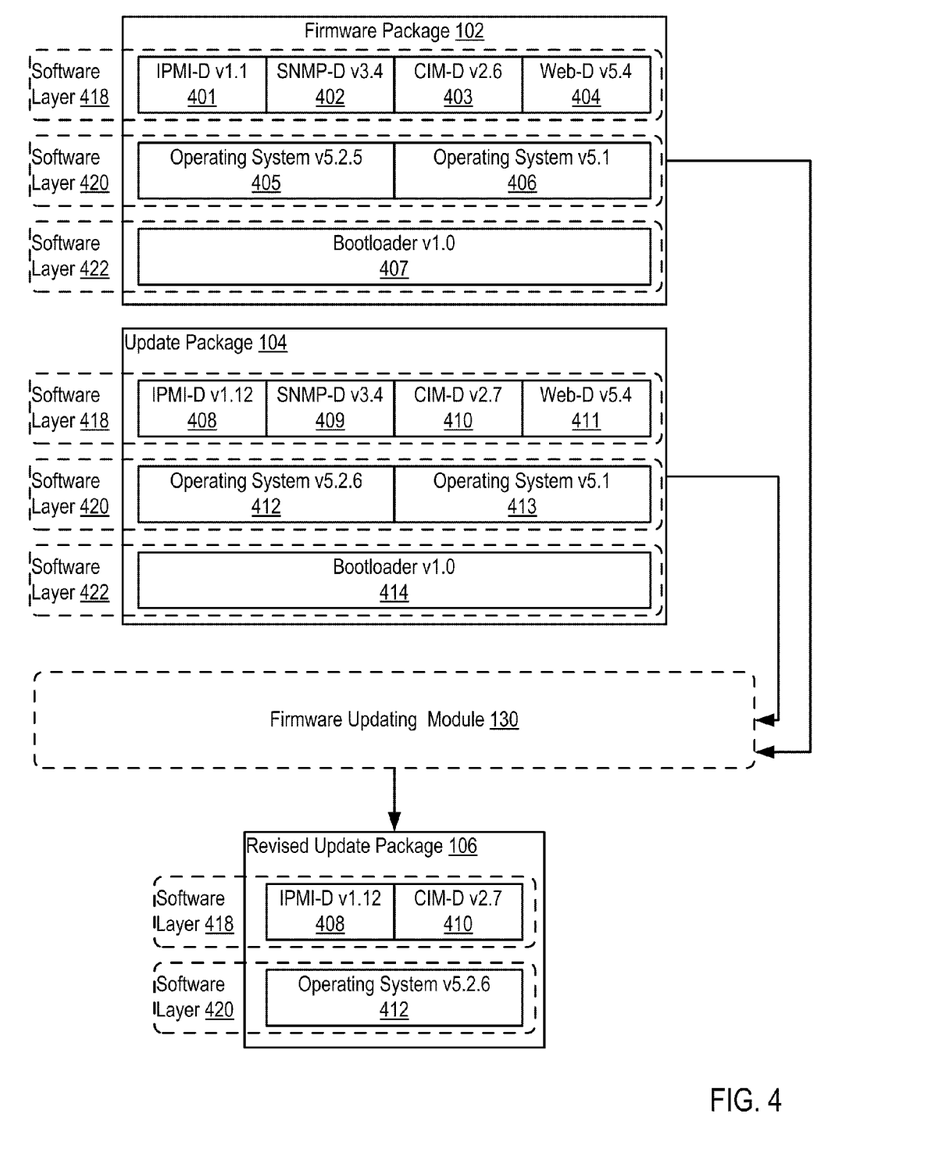
FIG. 4 sets forth a data flow diagram illustrating an example firmware package, update package, and revised update package employed in methods of updating a firmware package according to embodiments of the present invention.

For further explanation, FIG. 4 sets forth a data flow diagram illustrating an example firmware package (102), update package (104), and revised update package (106) employed in methods of updating a firmware package according to embodiments of the present invention. In example of FIG. 4, the firmware updating module (130) receives an update package (104) for the firmware package (102). The firmware package (102) in the example of FIG. 4 includes seven currently installed components (401-407), including a intelligent platform management interface (IPMI) component (401), a simple network management protocol (SNMP) component (402), a common information model (CIM) component (403), a web services component (404), two operating system components (405, 406), and a bootloader component (407). Each of the components is characterized by a version number. Each of the components supports one of three software layers (418, 420, 422).

The update package (204) includes seven update components (408-141) corresponding to the currently installed components (401-407). The update components include an IPMI component (408), an SNMP component (409), a CIM component (410), a web services component (411), two operating system components (412, 413), and a bootloader component (414). The update components (408-414) support the same software layers (418, 420, 422) as corresponding currently installed components (401-407).

The firmware updating module (130) retrieves information describing a state of the currently installed components (401-407)—in this example, the version numbers of the components (401-407). The firmware updating module (130) then compares version numbers of the currently installed components (401-407) to version numbers of the update components (408-414) and constructs a revised update package (106) that includes only update components (408, 410, 412) having more recent version numbers than the version numbers of the currently installed components (401-407). In this example, the IPMI update component (408) has a greater version number, 1.12, than the corresponding currently installed IPMI component (401) which has a version number of 1.1. The CIM update component (410) has a greater version number, 2.7, than the version number, 2.6, of the corresponding currently installed CIM component (403). The operating system update component (412) has a greater version number, 5.2.6, than the version number, 5.2.5, of the corresponding currently installed operating system component (405). All other update package components (409, 411, 413, and 414) have version numbers equal to the version numbers of correspond currently installed components (402, 404, 406, and 407).

After constructing the revised update package (106), the firmware updating module (130) updates the currently installed components (401, 403, and 405) with corresponding update components (408, 410, and 412) of the revised update package (106). In this way, only currently installed components for which an updated version is present are updated.

The method of FIG. 2 above includes, among other method steps, updating (210), by the firmware updating module, the currently installed components (212) with corresponding update components (216) of the revised update package (106). Such updating (210) may be carried out various ways. For further explanation, therefore, FIG. 5 sets forth a flow chart illustrating an exemplary method for updating (210) currently installed components of a firmware package with corresponding update components of a revised update package in accordance with embodiments of the present invention.

Figure 5:
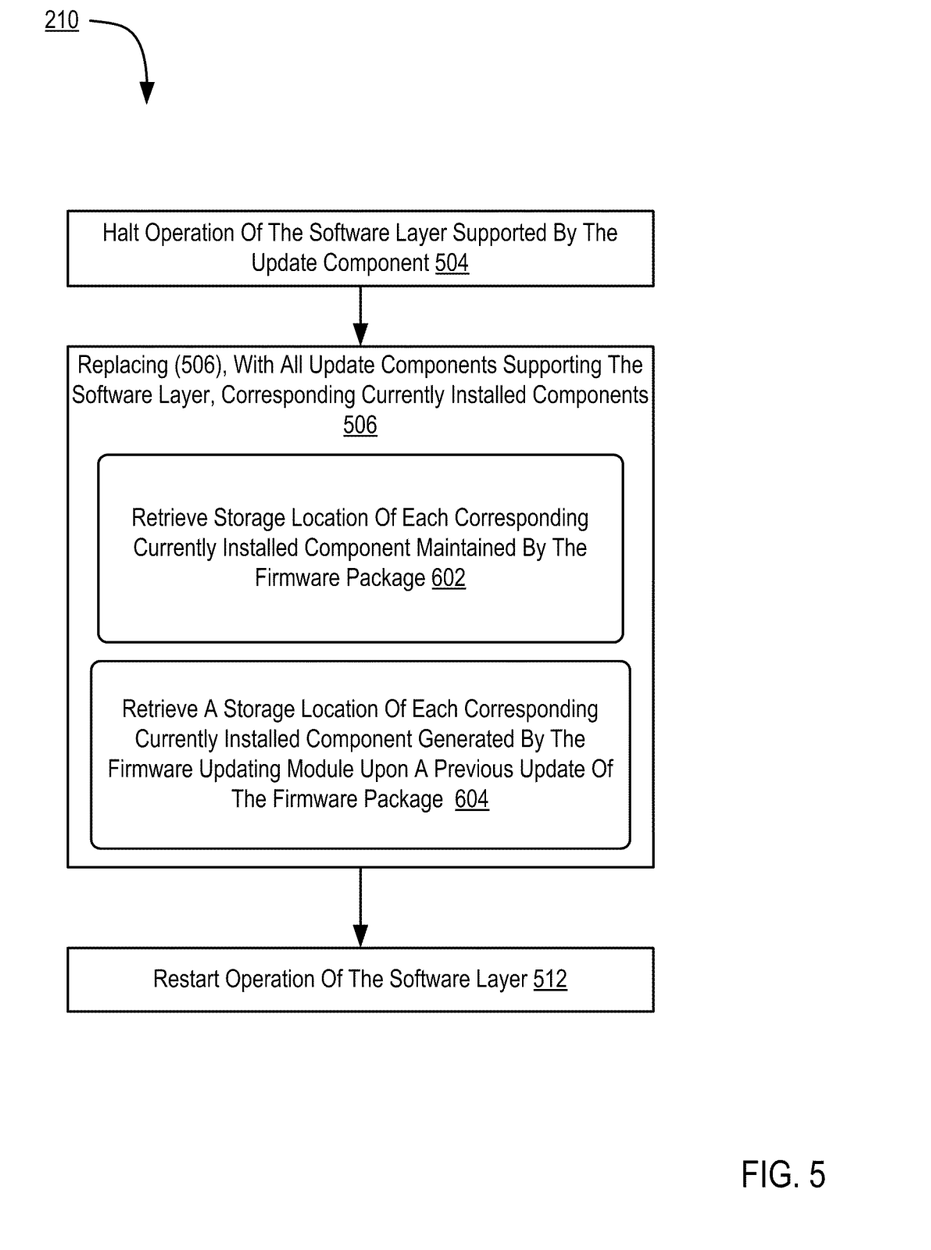
FIG. 5 sets forth a flow chart illustrating an exemplary method for updating currently installed components of a firmware package with corresponding update components of a revised update package in accordance with embodiments of the present invention.

The method of FIG. 5 is carried out for each software layer supported by an update component of the revised update package. The method of FIG. 5 includes halting (504) operation of the software layer, replacing (506), with all update components supporting the software layer, corresponding currently installed components, and restarting (512) operation of the software layer. In this way, only one software layer must halt operation during an update of the firmware components supporting the software layer. Other software layers may continue to operate uninterrupted.

Although the method of FIG. 5 includes halting (504) and restarting (512) operation of a software layer, readers of skill in the art will immediately recognize that updating (210) the currently installed components (212) with corresponding update components (216) of the revised update package (106) may alternatively include halting and restarting operation of the components being updated rather than an entire software layer. Furthermore, because of operational dependencies between components in various software layers, software layers other than the software layer supported by the update component may be halted and restarted during the update (210) of the currently installed component. A software layer that includes an IPMI or SNMP component with operational dependencies on an operating system software layer may be halted and restarted during update of a component of the operating system software layer.

In the method of FIG. 5 replacing (506), with all the update components supporting the software layer, corresponding currently installed components includes retrieving (602) storage location of each corresponding currently installed component maintained by the firmware package.

The firmware package may maintain a list, table, or other data structure that includes for each currently installed component: a pointers to the memory location at which the currently installed components is stored and an offset indicating a size of the component. With this information, the firmware updating module may erase the storage location identified by the pointer and offset and copy the update component to the same storage location.

Alternatively, firmware updating module may replacing (506), with all the update components supporting the software layer, corresponding currently installed components by retrieving (512) a storage location of each corresponding currently installed component generated by the firmware updating module upon a previous update of the firmware package. That is, the firmware updating module may be configured to generate and later update a data structure with storage locations of components installed by the firmware updating module. Such storage locations may be defined by a pointer to the memory location at which the component was previously stored and an offset defining a memory size of the component.

In view of the explanations set forth above, readers will recognize that the benefits of updating a firmware package according to embodiments of the present invention include:
  A reduced amount of time updating firmware by removing unnecessary updates of firmware components;
  An increased operability of a system supported by the firmware by enabling only one service at a time to be halted during the update; and
  An increased amount of data provided during an update to indicate progress of the update.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of updating a firmware package executing on a computer, the method comprising:
    receiving, by a firmware updating module comprising a module of automated computing machinery that includes an aggregation of computer hardware and executing computer program instructions, an update package for the firmware package, the firmware package comprising one or more currently installed components, each of the currently installed components supporting one of a plurality of software layers, wherein the plurality of software layers comprises an operating system layer, the update package comprising one or more update components that correspond to the currently installed components of the firmware package, each of the update components supporting one of the plurality of software layers;
    retrieving, by the firmware updating module from the firmware package during operation of the firmware package, information describing a state of the currently installed components;
    comparing, by the firmware updating module, the information describing the state of the currently installed components to information describing a state of the corresponding update components;
    constructing, by the firmware updating module without user intervention, a revised update package that includes only a subset of the update components, wherein the subset of the update components each have a state more recent than the state of the corresponding currently installed components; and
    updating, by the firmware updating module, the currently installed components with corresponding update components of the revised update package, wherein updating the currently installed components with corresponding update components of the revised update package comprises:
        for each software layer including the operating system layer of the plurality of software layers supported by one of the subset of update components of the revised update package:
            halting operation of the software layer while at least one of the plurality of software layers supported by at least one of the subset of update components continues to operate uninterrupted includes:
                halting one or more update components of the subset of update components supporting the software layer without halting the entire software layer; and
                halting one or more software layers other than the software layer supported by the one or more update components of the subset of update components that are operationally dependent between components in various software layers;
            replacing, with all update components supporting the software layer, corresponding currently installed components; and
            restarting operation of the software layer includes restarting the one or more update components of the subset of update components supporting the software layer;
    wherein the revised update package includes two or more update components supporting two or more software layers.

2. The method of claim 1 wherein:
    retrieving information describing a state of the currently installed components further comprises retrieving metadata including information describing the currently installed components, the information comprising version numbers of each currently installed component;
    comparing the information describing the state of the currently installed components to information describing a state of the corresponding update components further comprises comparing version numbers of the currently installed components to version numbers of corresponding update components; and
    constructing a revised update package further comprises including in the revised update package only update components having a version number greater than the version number of the corresponding currently installed components.

3. The method of claim 1 further comprising:
    monitoring progress of updating the currently installed components with corresponding update components of the revised update package; and
    reporting the progress to a user level application module.

4. The method of claim 1 wherein replacing, with all update components supporting the software layer, corresponding currently installed components further comprises:
    retrieving a storage location of each corresponding currently installed component maintained by the firmware package.

5. The method of claim 1 wherein replacing, with all update components supporting the software layer, corresponding currently installed components further comprises:
    retrieving a storage location of each corresponding currently installed component generated by the firmware updating module upon a previous update of the firmware package.

6. The method of claim 1 wherein:
    retrieving information describing the state of the currently installed components further comprises retrieving metadata including information describing the currently installed components, wherein the metadata is an extensible markup language (XML) document.

7. The method of claim 1 wherein the plurality of software layers further comprises a bootloader layer, a management services layer, and a web services layer.

8. The method of claim 1 wherein restarting operation of the software layer further includes restarting, during an update of the one or more update components of the subset of update components supported by the software layer, the one or more software layers other than the software layer supported by the one or more update components of the subset of update components.

9. An apparatus for updating a firmware package, the apparatus comprising a computer processor and a computer memory operatively coupled to the computer processor, the computer memory having disposed within it computer program instructions that when executed by the computer processor cause the apparatus to carry out the steps of:
receiving, by a firmware updating module comprising a module of automated computing machinery that includes an aggregation of computer hardware and executing computer program instructions, an update package for the firmware package, the firmware package comprising one or more currently installed components, each of the currently installed components supporting one of a plurality of software layers, wherein the plurality of software layers comprises an operating system layer, the update package comprising one or more update components that correspond to the currently installed components of the firmware package, each of the update components supporting one of the plurality of software layers;
retrieving, by the firmware updating module from the firmware package during operation of the firmware package, information describing a state of the currently installed components;
comparing, by the firmware updating module, the information describing the state of the currently installed components to information describing a state of the corresponding update components;
constructing, by the firmware updating module without user intervention, a revised update package that includes only a subset of the update components, wherein the subset of the update components each have a state more recent than the state of the corresponding currently installed components; and
updating, by the firmware updating module, the currently installed components with corresponding update components of the revised update package, wherein updating the currently installed components with corresponding update components of the revised update package comprises:
for each software layer including the operating system layer of the plurality of software layers supported by one of the subset of update component of the revised update package:
halting operation of the software layer while at least one of the plurality of software layers supported by at least one of the subset of update components continues to operate uninterrupted includes:
halting one or more update components of the subset of update components supporting the software layer without halting the entire software layer; and
halting one or more software layers other than the software layer supported by the one or more update components of the subset of update components that are operationally dependent between components in various software layers;
replacing, with all update components supporting the software layer, corresponding currently installed components; and
restarting operation of the software layer includes restarting the one or more update components of the subset of update components supporting the software layer;
wherein the revised update package includes two or more update components supporting two or more software layers.

10. The apparatus of claim 9 wherein:
retrieving information describing a state of the currently installed components further comprises retrieving metadata including information describing the currently installed components, the information comprising version numbers of each currently installed component;
comparing the information describing the state of the currently installed components to information describing a state of the corresponding update components further comprises comparing version numbers of the currently installed components to version numbers of corresponding update components; and
constructing a revised update package further comprises including in the revised update package only update components having a version number greater than the version number of the corresponding currently installed components.

11. The apparatus of claim 9 further comprising computer program instructions capable of:
monitoring progress of updating the currently installed components with corresponding update components of the revised update package; and
reporting the progress to a user level application module.

12. The apparatus of claim 9 wherein replacing, with all update components supporting the software layer, corresponding currently installed components further comprises:
retrieving a storage location of each corresponding currently installed component maintained by the firmware package.

13. The apparatus of claim 9 wherein replacing, with all update components supporting the software layer, corresponding currently installed components further comprises:
retrieving a storage location of each corresponding currently installed component generated by the firmware updating module upon a previous update of the firmware package.

14. The apparatus of claim 9 wherein:
retrieving information describing the state of the currently installed components further comprises retrieving metadata including information describing the currently installed components, wherein the metadata is an extensible markup language (XML) document.

15. A computer program product for updating a firmware package, the computer program product disposed upon a non-transitory computer readable medium, the computer program product comprising computer program instructions that, when executed, cause a computer to carry out the steps of:
receiving, by a firmware updating module comprising a module of automated computing machinery, an update package for the firmware package, the firmware package comprising one or more currently installed components, each of the currently installed components supporting one of a plurality of software layers, wherein the plurality of software layers comprises an operating system layer, the update package comprising one or more update components that correspond to the currently installed components of the firmware package, each of the update components supporting one of the plurality of software layers;

receiving, by a firmware updating module comprising a module of automated computing machinery that includes an aggregation of computer hardware and executing computer program instructions, an update package for the firmware package, the firmware package comprising one or more currently installed components, each of the currently installed components supporting one of a plurality of software layers, the update package comprising one or more update components that correspond to the currently installed components of the firmware package, each of the update components supporting one of the plurality of software layers;

retrieving, by the firmware updating module from the firmware package during operation of the firmware package, information describing a state of the currently installed components;

comparing, by the firmware updating module, the information describing the state of the currently installed components to information describing a state of the corresponding update components;

constructing, by the firmware updating module without user intervention, a revised update package that includes only a subset of the update components, wherein the subset of the update components each have a state more recent than the state of the corresponding currently installed components; and updating, by the firmware updating module, the currently installed components with corresponding update components of the revised update package, wherein updating the currently installed components with corresponding update components of the revised update package comprises:

for each software layer including the operating system layer of the plurality of software layers supported by one of the subset of update component of the revised update package:

halting operation of the software layer while at least one of the plurality of software layers supported by at least one of the subset of update components continues to operate uninterrupted includes:

halting one or more update components of the subset of update components supporting the software layer without halting the entire software layer; and halting one or more software layers other than the software layer supported by the one or more update components of the subset of update components that are operationally dependent between components in various software layers;

replacing, with all update components supporting the software layer, corresponding currently installed components; and restarting operation of the software layer includes restarting the one or more update components of the subset of update components supporting the software layer;

wherein the revised update package includes two or more update components supporting two or more software layers.

16. The computer program product of claim 15 wherein:

retrieving information describing a state of the currently installed components further comprises retrieving metadata including information describing the currently installed components, the information comprising version numbers of each currently installed component;

comparing the information describing the state of the currently installed components to information describing a state of the corresponding update components further comprises comparing version numbers of the currently installed components to version numbers of corresponding update components; and constructing a revised update package further comprises including in the revised update package only update components having a version number greater than the version number of the corresponding currently installed components.

17. The computer program product of claim 15 further comprising computer program instructions capable of:

monitoring progress of updating the currently installed components with corresponding update components of the revised update package; and reporting the progress to a user level application module.

18. The computer program product of claim 15 wherein replacing, with all update components supporting the software layer, corresponding currently installed components further comprises:

retrieving a storage location of each corresponding currently installed component maintained by the firmware package.

19. The computer program product of claim 15 wherein replacing, with all update components supporting the software layer, corresponding currently installed components further comprises:

retrieving a storage location of each corresponding currently installed component generated by the firmware updating module upon a previous update of the firmware package.

20. The computer program product of claim 15 wherein:

retrieving information describing the state of the currently installed components further comprises retrieving metadata including information describing the currently installed components, wherein the metadata is an extensible markup language (XML) document.

* * * * *